(12) United States Patent
Miksovsky et al.

(10) Patent No.: US 6,526,529 B1
(45) Date of Patent: Feb. 25, 2003

(54) DYNAMIC ERROR MESSAGING

(75) Inventors: Jan T. Miksovsky, Seattle, WA (US); Todd M. Colby, Redmond, WA (US); Warren G. Stevens, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/340,715

(22) Filed: Jun. 29, 1999

(51) Int. Cl.$^7$ .............................................. G06F 11/32
(52) U.S. Cl. ........................................ 714/57; 717/168
(58) Field of Search ............................. 714/48, 57, 38; 717/124, 125, 168, 171, 172, 173

(56) References Cited

U.S. PATENT DOCUMENTS

| | | | | |
|---|---|---|---|---|
| 5,892,898 A | * | 4/1999 | Fujii et al. ...................... | 714/57 |
| 5,897,630 A | * | 4/1999 | Schneider Huddleston Virta et al. ........................... | 706/45 |
| 5,909,215 A | * | 6/1999 | Berstis et al. ................. | 345/340 |
| 6,009,274 A | * | 12/1999 | Fletcher et al. .............. | 395/712 |
| 6,052,531 A | * | 4/2000 | Waldin, Jr. et al. ......... | 395/712 |
| 6,138,253 A | * | 10/2000 | Buzsaki ........................ | 714/48 |
| 6,151,643 A | * | 11/2000 | Cheng et al. ................. | 710/36 |
| 6,202,087 B1 | * | 3/2001 | Gadish ........................ | 709/206 |
| 6,304,882 B1 | * | 10/2001 | Strellis et al. .............. | 707/202 |

* cited by examiner

*Primary Examiner*—Scott Baderman
(74) *Attorney, Agent, or Firm*—Law Offices of Albert S. Michalik, PLLC

(57) ABSTRACT

A method and system for dynamically updating the error messages corresponding to a shipped software product. The exiting generic error messages shipped with a software product are replaced or appended as errors are resolved or better understood, whereby a user who receives an error message will see the latest known information for that error message. A file of updated error messages is automatically downloaded when the user is connected to the Internet. Any time an error message is to be displayed, an error handling mechanism compares identifier information of the error message to the file of updated error messages, and if a match is found, overwrites or extends the existing error message that was shipped with the code for display to the user. If no match is found, the existing message is displayed. An updated error message can be changed or reset to the original message if a problem changes or goes away, and updated messages may include certain identifying information for the purpose of assisting product support personnel in resolving user problems.

62 Claims, 6 Drawing Sheets

DYNAMIC ERROR MESSAGING

FIELD OF THE INVENTION

The present invention is directed generally to computer systems, and more particularly to error messages in computer operating systems and applications.

BACKGROUND OF THE INVENTION

When a software product such as an application or operating system detects an error, the product often outputs an error message to the user to help the user understand what error occurred and why the error occurred, so that the error can be avoided or overcome. For a number of reasons, some of these error messages are very general and limited in what they tell the user. These general error messages are thus usually of little help to the user or product support personnel called by the user, because they do not provide enough information to help resolve the problem, or avoid it in the future.

One reason that general error messages are used is that when a product is released to the market, some software bugs and other error-causing situations are not well understood, or are undiscovered at that time. It is not an efficient use of development resources to attempt to have a product precisely identify every error condition. Moreover, it may be extremely difficult for code to detect some error conditions, such as knowing whether another particular product or device is installed. The proper error conditions may not even exist when a product is released, as new problems may arise when the product is used on a new version of the operating system, or is used in conjunction with other new products or devices. Indeed, some errors are not the fault of the software product, but rather an error in some related software such as a device driver that can only be fixed by replacing the device driver.

After a product is released, the large base of users finds bugs and other problems that cannot be reasonably encountered or isolated by a software test team, particularly because many problems result from the wide variety of software and hardware configurations in actual use. Over the product cycle, the support team is often able to isolate the specific cause of many of these the problem based on user feedback, whereby a successful workaround or fix may be found. The now-recognized error information is often distributed in "FAQ's" (web sites or the like displaying answers to frequently asked questions) or message boards. However, only a small percentage of users who encounter the error may actually find the information.

As a result, even after a problem is recognized and a solution developed, many users still need to call product support to find out about the solution. However, such calls are expensive to handle. If the user is charged the expense, many users are very unsatisfied, particularly when the user did nothing wrong. In any event, both the user and the product manufacturer typically wish that the product could have handled the problem without having to call product support, or at least have been more helpful initially.

SUMMARY OF THE INVENTION

Briefly, the present invention provides a system and method for dynamically updating the error messages of a shipped software product. The existing, typically generic error messages shipped with a software product are replaced or appended as errors are resolved or better understood, whereby a user who receives an error message will see the latest known information for that error message.

When an indication of an error having an existing error message associated therewith is received at a centralized error handling mechanism, the mechanism attempts to locate data in a dynamic error message file data that corresponds to an updated error message for that error. If message information corresponding to the error is found, the found message information is used to provide an error message. If not found, the existing error message of the software product is provided.

The found message information may indicate whether to replace the existing error message with the updated error message or to append the updated error message to the existing error message. Blank fields may be provided in the updated error message, and conditions may be included with the updated error message data to determine whether the updated error message should apply. An updated error message can be changed or reset to the original message if a problem changes or goes away, and updated messages may include certain identifying information for the purpose of assisting product support personnel in resolving user problems.

Other advantages will become apparent from the following detailed description when taken in conjunction with the drawings, in which:

DETAILED DESCRIPTION OF THE PREFERRED EMBODIMENT

Exemplary Operating Environment

Figure 1:
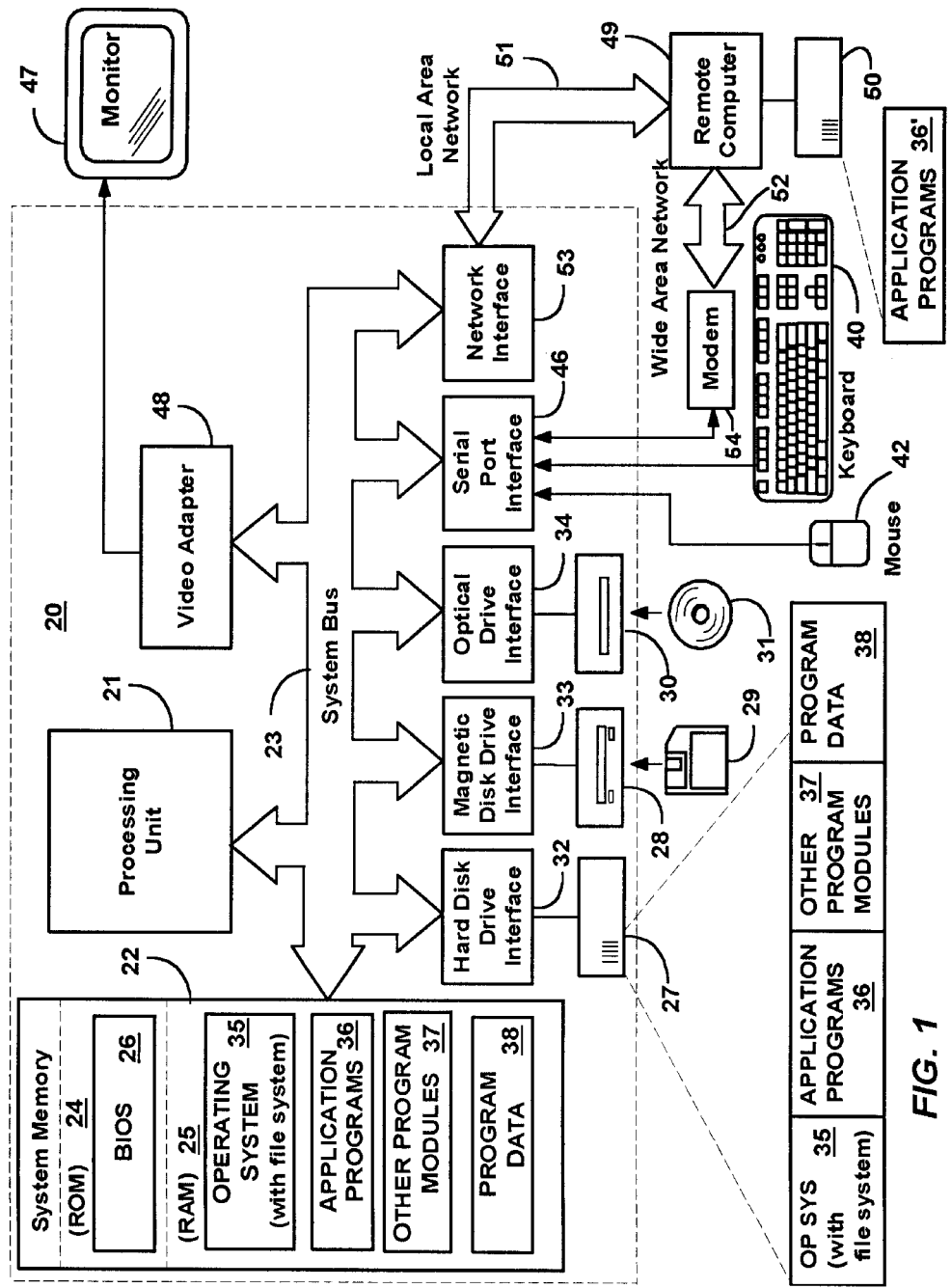
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows NT), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Dynamic Errors

In general, the present invention is directed to a method and system wherein updated error information and messages may be selectively and dynamically provided to a user after a software product, including error messages, is released to a user. As will be understood, however, such dynamic message information is preferably stored on the user's computer rather than being available only when the computer is online, e.g., connected to the Internet. Thus, as used herein, the term dynamic refers to the ability to provide updated error messages and the like to a user after a software product is released, even at times when the user is not connected to a remote source.

Figure 2:
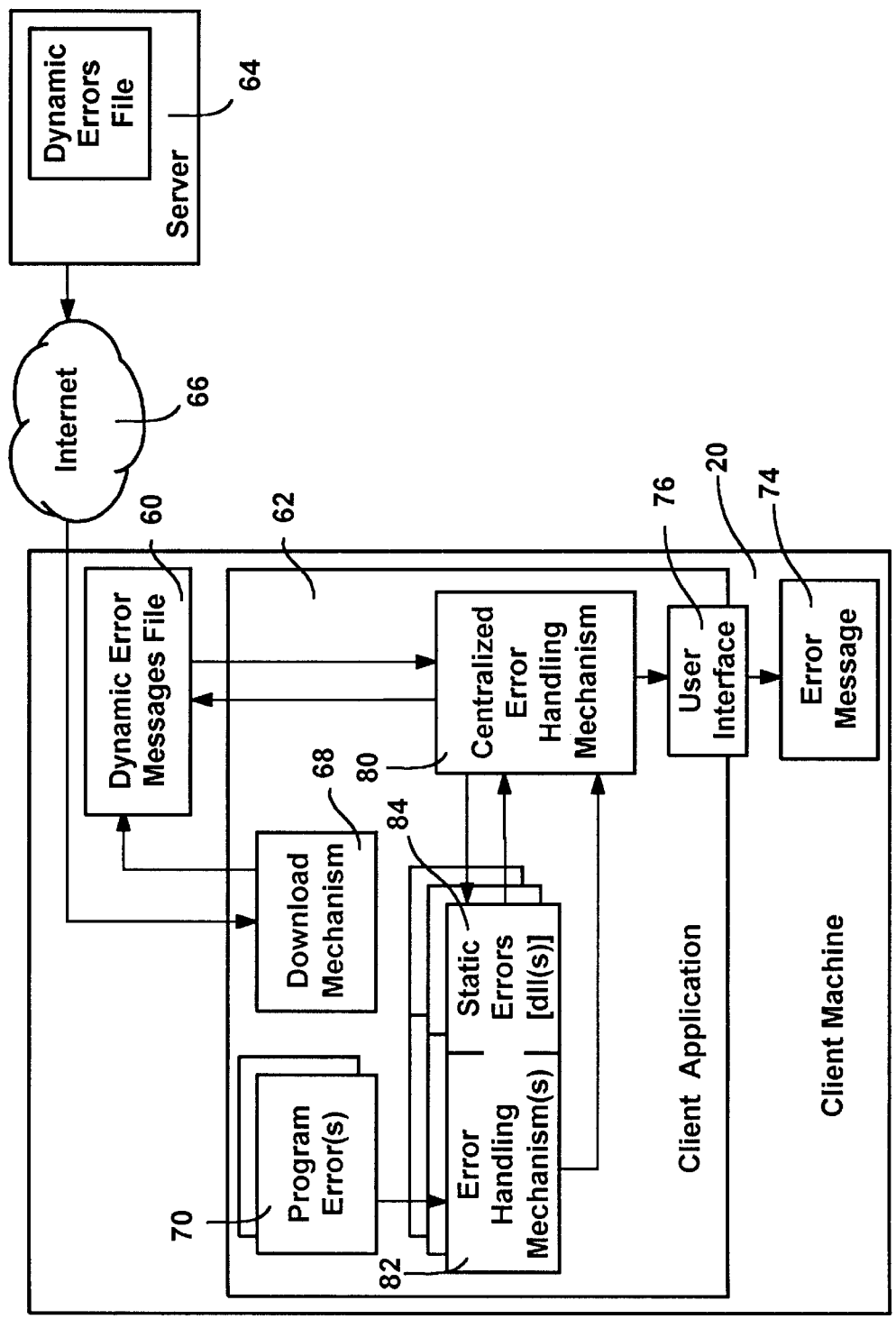
FIG. 2 is a block diagram representing general components for providing dynamic error messages in accordance with one aspect of the present invention.
Figure 3:
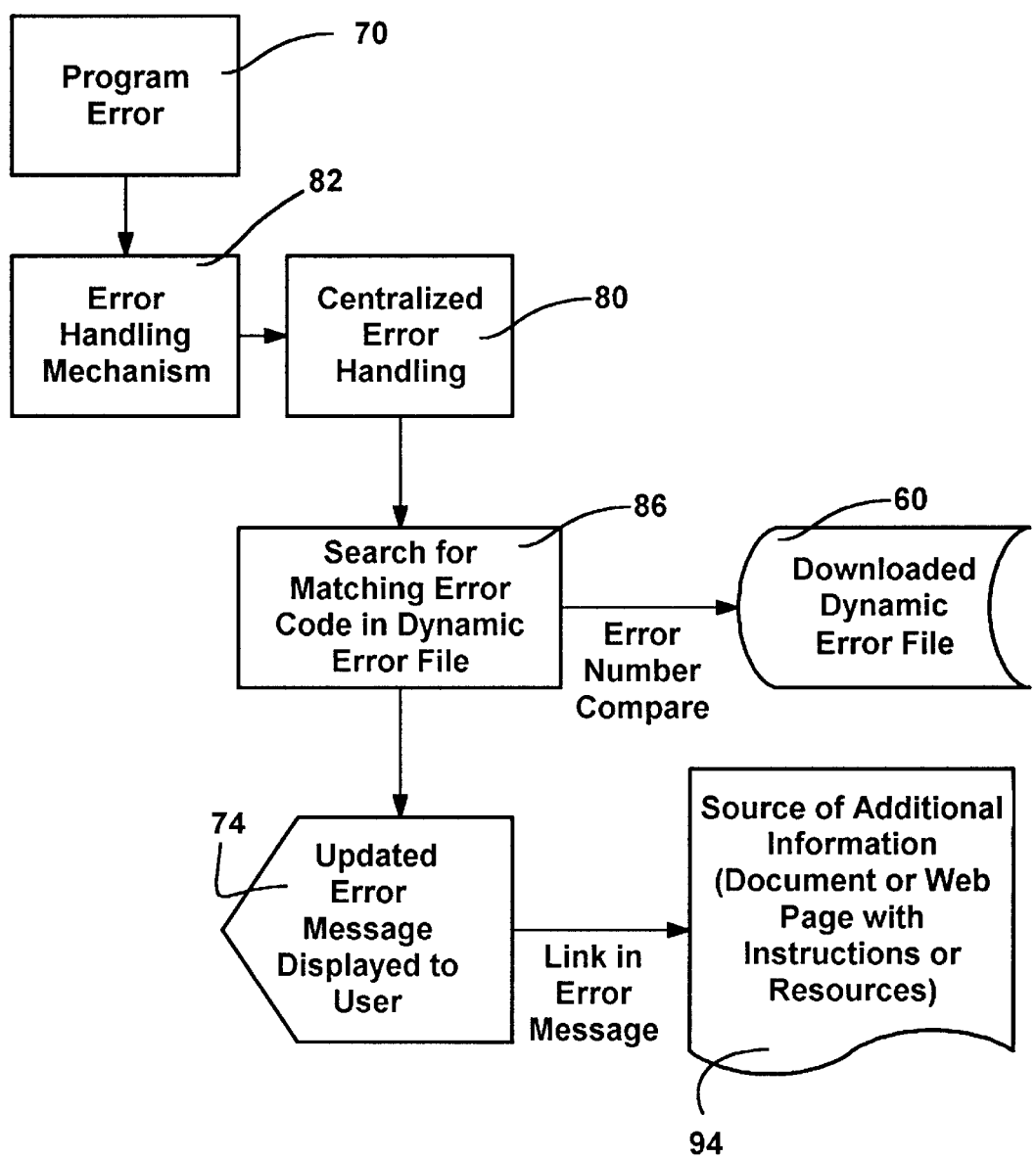
FIG. 3 is an alternative representation of the components of FIG. 2 and the relationships between those components for handling updated error messages.

Turning to FIGS. 2 and 3 of the drawings, a file comprising updated error message information (i.e., a dynamic error messages file 60) is downloaded for a software product (e.g., application program 62) from an external source such as a server 64 on the Internet 66 to a client machine, such as the computer system 20. The updated error message information may be accumulated in any manner, for example, by product support personnel in conjunction with the product development team. Those errors deemed worthwhile to have an updated error message therefor, e.g., those that have caused some threshold number of calls, are added to the dynamic error message file 60, such as in a text-based format described below.

The download mechanism 68 is part of the software product (application 62) that uses the information in the dynamic error messages file 60, or alternatively may include a browser hosted by the application 62 to access Internet web pages. In general, the client machine 20 may download this information while a user is connected to an appropriate site. As an enhancement, the download may occur automatically without the user necessarily asking for the file, or even without the user being aware of the download. For example, a financial application program (e.g., 62) may download its own updated error message file (e.g., 60) any time a user connects to the Internet 66 through the financial application program 62, such as to view stock quotes, pay electronic bills, and so on. Alternatively, a browser, whether standalone or integrated into the operating system, may be arranged to automatically seek one or more certain sites when the machine is online, and download one or more dynamic error message files from these sites. Note that the browser may be arranged to load various dynamic error files corresponding to multiple applications in the system.

Whether the download takes place depends on whether the user already has the most recent dynamic error message file in local storage, by comparing timestamps, version numbers or the like. In other words, the download takes place each time the local machine does not already have the most-recent version of the dynamic error messages file 60. More particularly, when appropriate connections are made, a summary file is downloaded that lists the files (and their file dates) that exist on the server. The list is used to compare against the last download date stored for each of the local files, and those that need updating are downloaded.

Error messages are primarily text, and thus dynamic error message files, which typically include error message information for only a subset of the total error messages in a product, are typically relatively small files, and are presently downloaded in their entirety. However, it is feasible to download only change information (i.e., the "deltas") to an existing file on the local client machine.

Moreover, although a download mechanism 68 is shown in FIG. 2, virtually any mechanism capable of placing information into a storage available to the client is equivalent. For example, the dynamic error message file may be distributed from another source, such as a compact disk (CD) distributed to registered users of programs, possibly storing updated error messages for more than one popular software product on a single CD. The Internet 66 is an excellent way to distribute information, however, and thus the present invention will be described herein in terms of downloading the information therefrom.

Once acquired, the dynamic error messages file 60 is stored in local storage on the client machine 20. Each dynamic error message file (e.g., 60) ordinarily corresponds to a particular software product, such as the client application program 62 that is capable of using the file, i.e., is aware of the possibility of such a file being present, and when present, has the ability to access that dynamic error message file 60. Note that although an application program 62 is shown, it will be readily understood that virtually any software product that provides error messages may benefit from the present invention, in particular also an operating system.

Because the dynamic error messages file 60 is preferably maintained in local storage, as opposed to a remote location, the application 62 has fast access to the file, and further enables the dynamic error messaging system of the present invention to operate while the user is not online. Moreover, the use of local storage for the dynamic error messages file 60 solves a number of problems that may arise when an online connection is causing the error message. For example, if a new error is being caused by an Internet-related problem, the application 62 may not be able to access the Internet 66 at that instant to provide an updated message to the user.

In general, when a software product detects or receives a (numbered) error 70 via some error detection code in the product, an appropriate error handling mechanism in the code outputs an error message 74 to the user via some user interface 76. A centralized error handling mechanism 80 in the form of an internal API may be used to handle the output of messages initially handled by one or more dll-based error handlers 82. The error message handlers 80, 82 have heretofore output static messages 84 corresponding to the error number, these existing, static messages 84 shipped with and maintained as part of the application, e.g., in dynamic link libraries (DLLs).

Figure 4:
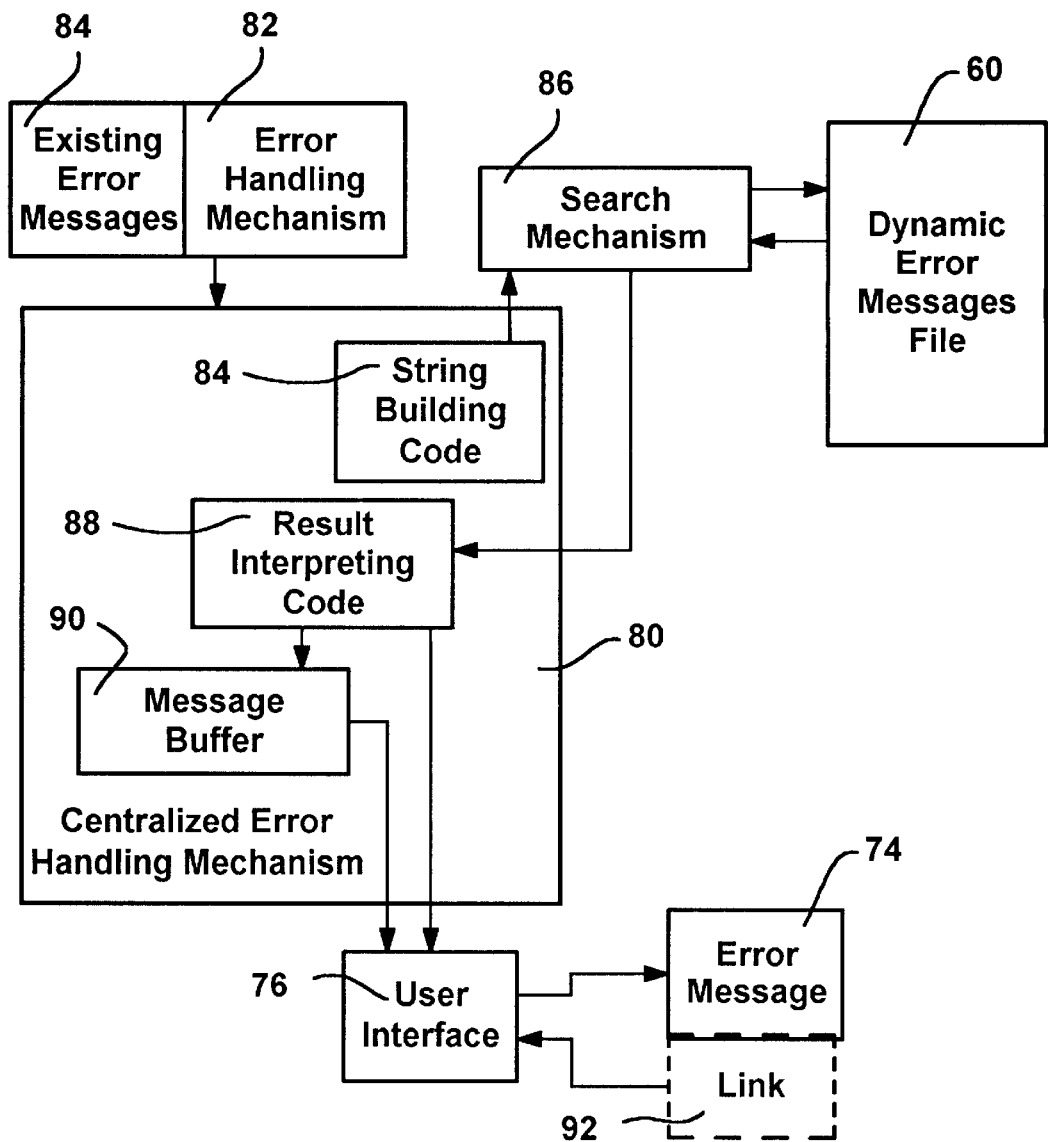
FIG. 4 is a block diagram representing an improved error handling mechanism for handling updated error message information in accordance with one aspect of the present invention.

In accordance with one aspect of the present invention, the existing error message information remains with the dll, but may be appended to or replaced by additional updated information. To this end, as represented in FIGS. 2–4, the centralized error handling mechanism 80 is enhanced to be able to handle dynamic message information. When the centralized error handling mechanism 80 is called at display time by the dll-based error handling mechanism 82, the centralized error handling mechanism 80 first searches the dynamic error messages file 60 for updated error message information for that error. More particularly, the centralized error handling mechanism 80 is passed a numerically-identified errorcode, and knows which dll is calling. From the errorcode and dll identity, a search string is built (e.g., by code 84, FIG. 4), and the dynamic error messages file 60 searched for the error information by a search mechanism 86. The search mechanism may be internal to the centralized error handling mechanism 80, e.g. a simple string compare function, or may be a system component such as an API (GetProfileString) that searches ".ini" files, a convenient format for storing dynamic error messaging information, as described below. If corresponding dynamic error message information exists in the file, the centralized error handling mechanism 80 interprets (as described below) the information via some result interpreting code 88 to provide the updated error message 74 to the user. If no dynamic error message information exists, the centralized error handling mechanism 80 uses the existing, static message 84 for output to the user, as also described below.

To provide an updated error message 74 when corresponding dynamic error message information is located in the search, the centralized error handling mechanism 80 looks to data in the dynamic error message file 60 that indicates how the updated error message information should be interpreted. For example, in one format, the existing, static error message 84 may be either replaced by an updated error message 74 in the file, or the original static error message 84 may have the updated error message 74 appended thereto. In one likely instance, the original error message 74 may be accurate, but newly noted, more detailed information may be appended to the original message 74 to help a user understand and overcome the problem. For example, a message such as "A problem may occur if you are running version 2.0 of program X; to fix this problem, re-install program X with option Y selected" may be valuable to users of program X, while the original error message is still valid for non-users of program X.

Alternatively, a general error message may be of little value, whereby a replacement message would be more appropriate. The centralized error handling mechanism 80 includes an output message buffer 90 or the like to load and/or construct the appropriate error message for output.

As shown in FIG. 4, the message may include a link 92 to a source 94 (FIG. 3) of more information. The link may be to a local source (e.g., document), or to an external source such as an Internet web page, whereby additional information may be accessed at the option of the user. However, in keeping with the present invention, the user does not have to search for this additional information, as the link to the content is provided in the dynamic error message. Note that the link may be to any local or remote source, and not just to passive information, e.g., the link may start a troubleshooting wizard or the like to help the user.

Figure 5A:
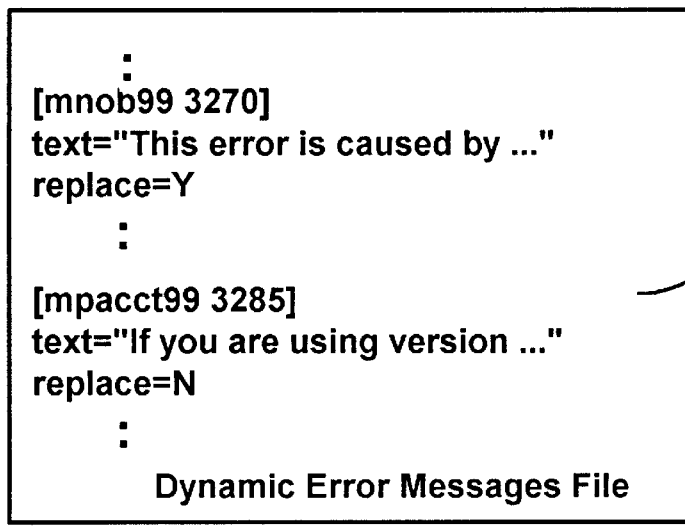
FIGS. 5A–5C represent exemplary formats for maintaining updated error message information in accordance with various aspects of the present invention.
Figure 5B:
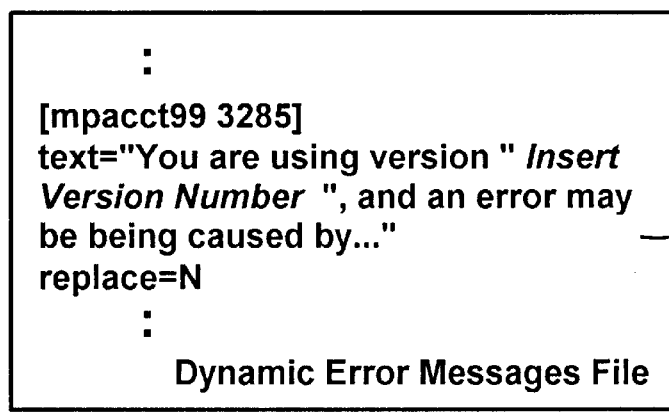
Figure 5C:
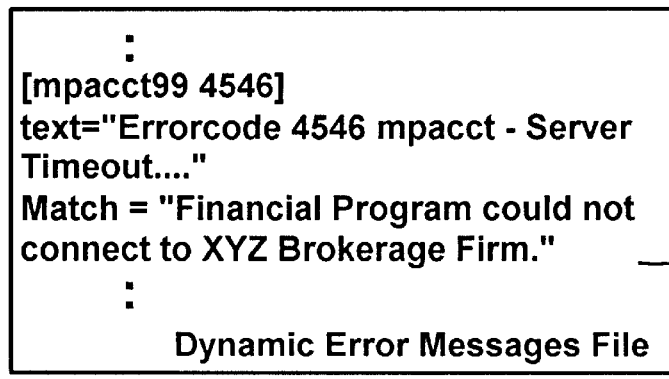

As shown in FIGS. 5A–5C, in one preferred, text-based format, (i.e., the ".ini" file format), each set of updated message information begins with a bracketed identifier of the dll and error code. This dll name (without extension) and errorcode corresponds to search strings built by the centralized error handling mechanism 80, whereby a call to the Windows API GetprofileString() results in a relatively rapid search of the dynamic error messages file 60 for a corresponding dynamic error message. The updated message text follows after the "Text=" label as shown in FIGS. 5A–5C. Note that as shown in FIG. 5C, for product support purposes, the errorcode and DLL identifier may be part of the viewable output message, (whether in the existing or updated message), so that product support personnel may quickly log and/or reference the related message to better enable future updates.

As also shown in FIGS. 5A–5C, replacement instructions may follow, presently requiring a true replace statement to overwrite the existing message rather than append the dynamic message thereto. In other words, if the replace instruction is not present or is not affirmative, the message will be appended to the existing error message. As can be appreciated, the developer of the dynamic error messages file 60 thus has control over precisely what message the user will see.

Although not necessary to the present invention, the format may be extended to further extend how updated messages may be presented to a user. For example, as shown in FIG. 5B, the message may include a blank string that enables appropriate updated/downloaded error message information to be inserted into the message at display time for certain users. As long as the centralized error handling mechanism has some way of differentiating user specific information, e.g., this user connects via a modem, different downloaded error messages may be presented to different users. Note that the static messages may be developed with dynamic error messaging in mind, such as to include blanks (perhaps with some default text) in the original message, and downloaded information used to fill in the blanks.

Moreover, as shown in FIG. 5C, a certain condition may have to be matched before updated error message information may apply. A match string as shown in FIG. 5C is included with the error messaging information for this purpose. To this end, the application 62 constructs the entire error message it wants to display. For example, the original message string may read, "Financial Program could not connect to <insert financial institution name here>." The application 62 then fills in the blank, producing an error message string such as, "Financial Program could not connect to XYZ Brokerage Firm." Next, the application 62 searches for possible updates to this error message, using an error ID number. If the application 62 finds a possible match, it further checks to see whether the entire text it wants to show matches the entire text of the text specified in the updated error message's "Match" parameter, whereby the updated message will be displayed or not depending on whether a match is detected. As a result, only users that match will have their existing error message replaced or appended with the dynamic error message, e.g., users having a financial institution of ABC Bank will receive the original message, while users of XYZ Brokerage firm will receive the updated message.

Note that although the application 62 does not currently support the ability to search for substrings in an error message, it may be configured to do so, whereby, for example, the match parameter would list only the variable "XYZ Brokerage Firm" portion of the string. Moreover, it is feasible to configure the system such that multiple conditions may be implemented via logical ANDs, ORs XORs, NOTs and so forth, e.g., replace a message if a user matches the brokerage firm string AND connects via a modem. Also, alternative messages may be provided for the same error code by having different match information, e.g., append one message if one condition is met, replace with another if another condition is met, or append a third if neither is met. As long as the centralized error handling mechanism 80 understands the format and can interpret the information therein, virtually any scheme for using updated messages at display time may be used with the present invention. For example, a header in the dynamic error messages file may indicate how to handle messages globally, or apply per-message, e.g., replace all unless append is true.

Figure 6:
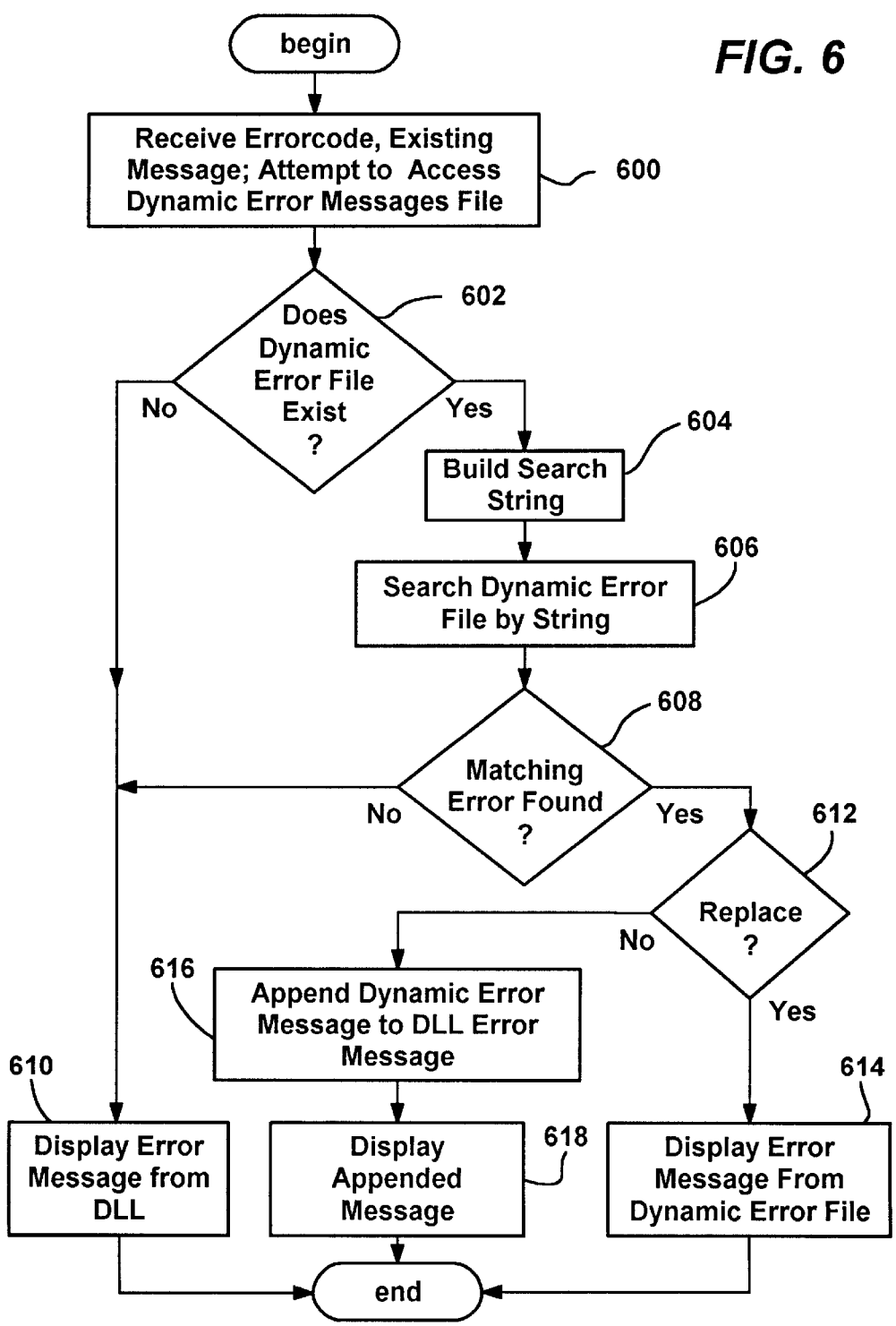
FIG. 6 is a flow diagram generally representing the steps taken to provide error messages in accordance with one aspect of the present invention.

Turning now to an explanation of the operation of the invention with particular reference to the flow diagram of FIG. 6, step 600 represents the receipt of an errorcode and existing message (or pointer thereto) when the centralized error handling mechanism 80 is called. The centralized error handling mechanism 80 attempts to access (open or use if already open) the dynamic error messages file 60. If the file does not exist or otherwise cannot be accessed, step 602 branches ahead to step 610 where the existing, static message is from the dll is displayed. As can be readily appreciated, steps 602 and 610 enable a product to be shipped "dynamic-error-ready," even before any new error message information is available. Steps 602 and 610 also provide the original error message even in situations wherein the dynamic error messages file 60 can no longer be accessed, e.g., when the user has moved or deleted the dynamic error messages file 60.

Step 604 represents the building of the search string, that is, some suitable, file-unique index depending on the format used, in the centralized error handling mechanism 80.

Step 606 represents the searching for updated error message information that corresponds to the errorcode, dll identity, i.e., as described above, the ".ini" format enables a call to a Windows API to quickly search for the error message information. At step 608, the results are first interpreted, whereby if no match is found, step 608 branches to step 610 to output the existing static message from the dll. This enables the use of dynamic error message updates on only selected messages, i.e., the original message is used unless the file 60 specifically includes new message information specifying otherwise.

Alternatively, if a match is found at step 608, step 608 branches to step 612 to interpret the message part of the result, for example, to determine whether to append or replace the existing message. If the message is to be replaced, step 612 branches to step 614 to output the text of the message from the dynamic error messages file 60. Otherwise, step 616 is executed to retrieve the original message and append to dynamic message thereto, whereby step 618 outputs the combined message from the buffer 90. Note that other tests, decisions and operations may be performed before displaying the message at either steps 610, 614 or step 618, for example, to determine whether certain conditions exist, fill in any blanks in a message, and so forth, as described above.

One benefit of the present invention is that the original error messages are maintained. Among other advantages, this enables the use of temporary dynamic messaging. For example, a problem may arise with a financial application program as a result of a bank switching to new banking software at the server end. As calls begin coming in to product support and new information about the error is recognized, the dynamic messages file may be quickly be developed or updated with the new information, whereby users will receive an updated message file to hopefully reduce the number of future calls. If the bank then fixes the software at the server end, the dynamic error messages file can again be revised to remove the now-outdated message, so that users are not misled.

As can be seen from the foregoing detailed description, there is provided a method and system that provide dynamic error messaging in a straightforward, extensible, flexible and efficient manner. Dynamic error messages may be developed and distributed as new information is known about errors provided by a software product, whereby users will obtain the new information without having to search or call for it.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer-readable medium having computer-executable instructions, comprising:
   receiving an indication of an error having an existing error message associated therewith;
   locating data corresponding to an updated error message,
   adding information to text of the updated error message; and
   outputting an error message including information corresponding to the updated error message.

2. The computer-readable medium having computer-executable instructions of claim 1, wherein the existing error message has an identifier associated therewith, and receiving the indication includes receiving the identifier.

3. The computer-readable medium having computer-executable instructions of claim 2, wherein locating data includes searching a file of dynamic error message information via the identifier.

4. The computer-readable medium having computer-executable instructions of claim 2, wherein locating data includes searching a file of dynamic error message information via the identifier in conjunction with a file identifier.

5. The computer-readable medium of claim 4 including further computer-executable instructions comprising, constructing a string for searching the file.

6. The computer-readable medium having computer-executable instructions of claim 4, wherein the file identifier corresponds to a file having the existing error message therein.

7. The computer-readable medium having computer-executable instructions of claim 4, wherein the file identifier corresponds to a dynamic link library.

8. The computer-readable medium of claim 1 including further computer-executable instructions comprising, evaluating the data corresponding to the updated error message to determine whether to append the updated error message to the existing error message or replace the existing error message with the updated error message.

9. The computer-readable medium having computer-executable instructions of claim 1, wherein outputting the error message includes appending text of the updated error message to text of the existing error message.

10. The computer-readable medium having computer-executable instructions of claim 1, wherein outputting the error message includes outputting text of the existing error message.

11. The computer-readable medium of claim 1 including further computer-executable instructions comprising, evaluating the data corresponding to the updated error message to determine whether at least one condition in the data is met.

12. The computer-readable medium of claim 11 comprising further computer-executable instructions comprising, outputting an error message based on the result of evaluating the data, the error message including text corresponding to the updated error message.

13. The computer-readable medium having computer-executable instructions of claim 1, wherein outputting the error message includes outputting a link to a source of additional information.

14. The computer-readable medium of claim 1 wherein the data corresponding to an updated error message is maintained in a file in local storage, and further including computer-executable instructions for downloading the file from a remote source.

15. The computer-readable medium of claim 14 wherein the download occurs automatically.

16. In a computer system including a software product having error messages, a method comprising:
   maintaining a file of updated error message information;
   receiving an indication of an error;
   searching the file for message information corresponding to the error, and if found, using the found message information to provide an error message, including filling in text to a blank field within text of the found message information, and if not found, providing an error message from the software product.

17. The method of claim 16 wherein receiving the indication includes receiving an error identifier corresponding to the error message of the software product, and searching the file includes using the error identifier in the search.

18. The method of claim 16 wherein searching the file includes using a file identifier corresponding to a dynamic link library of the software product.

19. The method of claim 18 further comprising constructing a string for searching the file based on the file identifier and an error identifier.

20. The method of claim 16 wherein using the found message information includes evaluating the found message information to determine whether to append text in the found message information to text of the error message of the software product.

21. The method of claim 16 wherein using the found message information includes evaluating the found message information to determine whether to overwrite text of the error message of the software product with text in the found message information.

22. The method of claim 16 wherein using the found message information includes evaluating the found message information to determine whether at least one condition in the data is met.

23. The method of claim 22 wherein the found message information includes a link to a source of additional information.

24. The method of claim 16 wherein maintaining a file of updated error message information includes, receiving the file from a remote source, and storing the file at a local storage of the computer system.

25. The method of claim 24 wherein receiving the file from the remote source includes, downloading the file from an Internet site.

26. A computer-readable medium having stored thereon a data structure, comprising:
   a first set of information identifying an error;

a second set of information corresponding to an updated error message, and a third set of information indicating whether the updated error message will overwrite an existing error message of a software product or will be combined with data of the existing error message.

27. The computer-readable medium having stored thereon the data structure of claim 26, wherein the first set of information includes an errorcode and a file identifier.

28. The computer-readable medium having stored thereon the data structure of claim 26, wherein the second set of information includes a string of text.

29. The computer-readable medium having stored thereon the data structure of claim 26, further comprising, a fourth set of information representative of a match condition indicating whether the updated error message is applicable.

30. The computer-readable medium having stored thereon the data structure of claim 26, wherein the second set of information includes a link to another source of data.

31. A computer-readable medium having computer-executable instructions, comprising:

selecting errors in a software product for updating error message information therein;

storing in a file the updated error message information for the errors selected, along with information identifying whether to replace existing error messages of a software product or combine the error messages of the software product with the updated error message information; and providing the file to at least one user of the software product.

32. The computer-readable medium of claim 31 including further computer-executable instructions for, removing the updated error message information for at least one previously selected error.

33. The computer-readable medium of claim 31 including further computer-executable instructions for, storing in the file at least one link to another source of information.

34. In a computer system including a software product having error messages, a system comprising:

a dynamic error messages file of updated error message information;

an error handler for receiving an errorcode from the software product indicative of an error;

a search mechanism associated with the error handler for searching the dynamic error messages file for information corresponding to the errorcode and providing a search result; and a user interface connected to the error handler for outputting a selected error message based on the search result.

35. The system of claim 34 wherein the error handler interprets the search result to determine whether to output an existing error message of the software product.

36. The system of claim 35 wherein the error handler outputs the existing error message via the user interface if the search result indicates that no updated error message corresponds to the errorcode.

37. The system of claim 35 wherein the error handler outputs an updated error message via the user interface if the search result indicates that an updated error message corresponds to the errorcode.

38. The system of claim 35 wherein the error handler outputs an updated error message via the user interface if the search result indicates that an updated error message corresponds to the errorcode and that the updated error message should replace the existing error message.

39. The system of claim 35 wherein the error handler outputs an updated error message and the existing message of the software product via the user interface if the search result indicates that an updated error message corresponds to the errorcode and that the updated error message should be combined with the existing error message.

40. The system of claim 34 further comprising an additional source of information, and wherein the error handler outputs an updated error message having a link to the additional source of information.

41. The system of claim 34 wherein the dynamic error messages file is formatted in a text-based format.

42. The system of claim 34 wherein at least one existing error message of the software product is maintained in a dynamic link library of the product.

43. In a computer system, a method, comprising:

receiving an indication of an error having an existing error message associated therewith;

locating updated error message data corresponding to the existing error message;

evaluating a replacement instruction associated with the updated error message data to determine whether to combine the updated error message data with the existing error message or replace the existing error message with the updated error message data; and a) if the replacement instruction associated with the updated error message indicates that the updated error message is to be combined, outputting a combined error message including information corresponding to the existing error message and the updated error message data; and b) if the replacement instruction associated with the updated error message indicates that the updated error message is to be replaced, outputting an error message including information corresponding to the updated error message data.

44. The method of claim 43 wherein the updated error message data includes the replacement instruction, and wherein evaluating the replacement instruction includes searching a file of dynamic error message information that includes text to output and the replacement instruction.

45. The method of claim 45 wherein locating data includes constructing a string comprising a combination of a file identifier corresponding to a file containing the existing error message and an error message identifier, and searching a file of dynamic error message information via the string.

46. The method of claim 43 further comprising, adding information to text of the updated error message.

47. The method of claim 43 further comprising, evaluating the updated error message data to determine whether at least one condition is met.

48. The method of claim 43 wherein outputting the error message includes outputting a link to a source of additional error information.

49. The method of claim 43 wherein the updated error message data is maintained in a file in local storage, and further comprising, downloading the file from a remote source.

50. A computer readable medium having computer-executable instructions for performing the method of claim 43.

51. In a computer system, a method, comprising:

receiving an indication of an error having an existing error message associated therewith;

determining that updated error message data corresponds to the existing error message;

after determining that updated error message data corresponds to the existing error message, locating condition data included with the updated error message data and evaluating the condition data to determine whether other updated error message data applies; and
  a) if the condition data is satisfied, applying the other updated error message data to provide an updated error message; and
  b) if the condition data is not satisfied, outputting the existing error message.

52. The method of claim 51 wherein the condition data is satisfied, wherein the updated error message data includes replacement data, and wherein applying the other updated error message includes evaluating the replacement data to determine whether to combine the updated error message data with the existing error message or whether to replace the existing error message, to provide the updated error message.

53. The method of claim 51 wherein determining that updated error message data corresponds to the existing error message includes searching a file of dynamic error message information.

54. The method of claim 51 further comprising, adding information to text of the updated error message.

55. The method of claim 51 wherein outputting the error message includes outputting a link to a source of additional error information.

56. The method of claim 51 wherein the updated error message data is maintained in a file in local storage, and further comprising, downloading the file from a remote source.

57. A computer readable medium having computer-executable instructions for performing the method of claim 51.

58. In a computing environment, a method of providing error-related information to a computing user, comprising:
  receiving an indication of an error having an existing error message associated therewith;
  locating updated error message data corresponding to the error; and
  outputting an updated error message including information based on the updated error message data, including outputting a link that when selected by the user provides additional information about the error.

59. The method of claim 58 wherein the updated error message data is maintained in a file in local storage, and further comprising, downloading the file from a remote source.

60. The method of claim 58 wherein the link provides the additional information from a remote source.

61. In a computing environment, a system comprising:
  an executable software product comprising at least one component;
  a first file set comprising at least one static error message file, the first set providing original error messages for the executable software product to select and output in response to an error;
  a second file set comprising at least one dynamic error message file, the second set providing updated error messages for the executable software product to select and output in response to an error,
  an error handling mechanism in the executable software product; and
  "a centralized error handling mechanism that is called by the error handling mechanism in the executable software product from an errorcode included with the call to determine the content of an error message to output in response to an error."

62. The method of claim 61 wherein at least part of the second file set is downloaded from a remote source.

* * * * *